United States Patent [19]
Ferrada et al.

[11] 3,917,938
[45] Nov. 4, 1975

[54] INTERIOR LIGHTS FOR MOTOR VEHICLES

[75] Inventors: Stephen Salvador Ferrada, Kenilworth; Ronald David Wisdom, Coventry; Thomas Geoffrey Rex Fleming, Bitteswell, all of England

[73] Assignee: Chrysler United Kingdom Limited, London, England

[22] Filed: Feb. 28, 1974

[21] Appl. No.: 446,917

[30] Foreign Application Priority Data
Mar. 2, 1973   United Kingdom............... 10311/73

[52] U.S. Cl............. 240/7.1 R; 240/7.35; 240/46.03
[51] Int. Cl.².......................................... B60Q 3/02
[58] Field of Search............... 240/7.1 R, 7.25, 7.35, 240/7.4, 10.6, 46.01, 46.03, 46.19, 46.23, 46.53, 108 R, 108 BA, 108 BC, 22, 4.2

[56] References Cited
UNITED STATES PATENTS

| | | | |
|---|---|---|---|
| 1,303,147 | 5/1919 | Woodman | 240/7.1 R |
| 1,474,451 | 11/1923 | Stückelberger | 240/46.53 X |
| 2,075,199 | 3/1937 | Horner | 240/108 C |
| 2,129,070 | 9/1938 | Rottinger | 240/7.1 R |
| 2,433,690 | 12/1947 | Garstang | 240/46.03 X |
| 2,611,019 | 9/1952 | Warner | 240/10.6 R |
| 2,785,293 | 3/1957 | Smith et al. | 240/108 C |
| 3,358,134 | 12/1967 | Gonyea | 240/7.35 |
| 3,375,364 | 3/1968 | Marcus | 240/4.2 |
| 3,532,875 | 10/1970 | Keller | 240/46.03 X |

FOREIGN PATENTS OR APPLICATIONS 1,053,546   1/1967   United Kingdom.................. 240/4.2

Primary Examiner—Samuel S. Matthews
Assistant Examiner—Alan Mathews
Attorney, Agent, or Firm—Edward F. Connors

[57] ABSTRACT

The disclosure relates to an interior light for a motor vehicle having a lamp body provided with light bulbs enclosed by a diffuser to provide general illumination. An opaque cover is slidably mounted on the lamp body over the diffuser and the cover has two divergent lenses which are alternately registerable with the diffuser to provide focussed beams of light directed in divergent directions.

5 Claims, 4 Drawing Figures

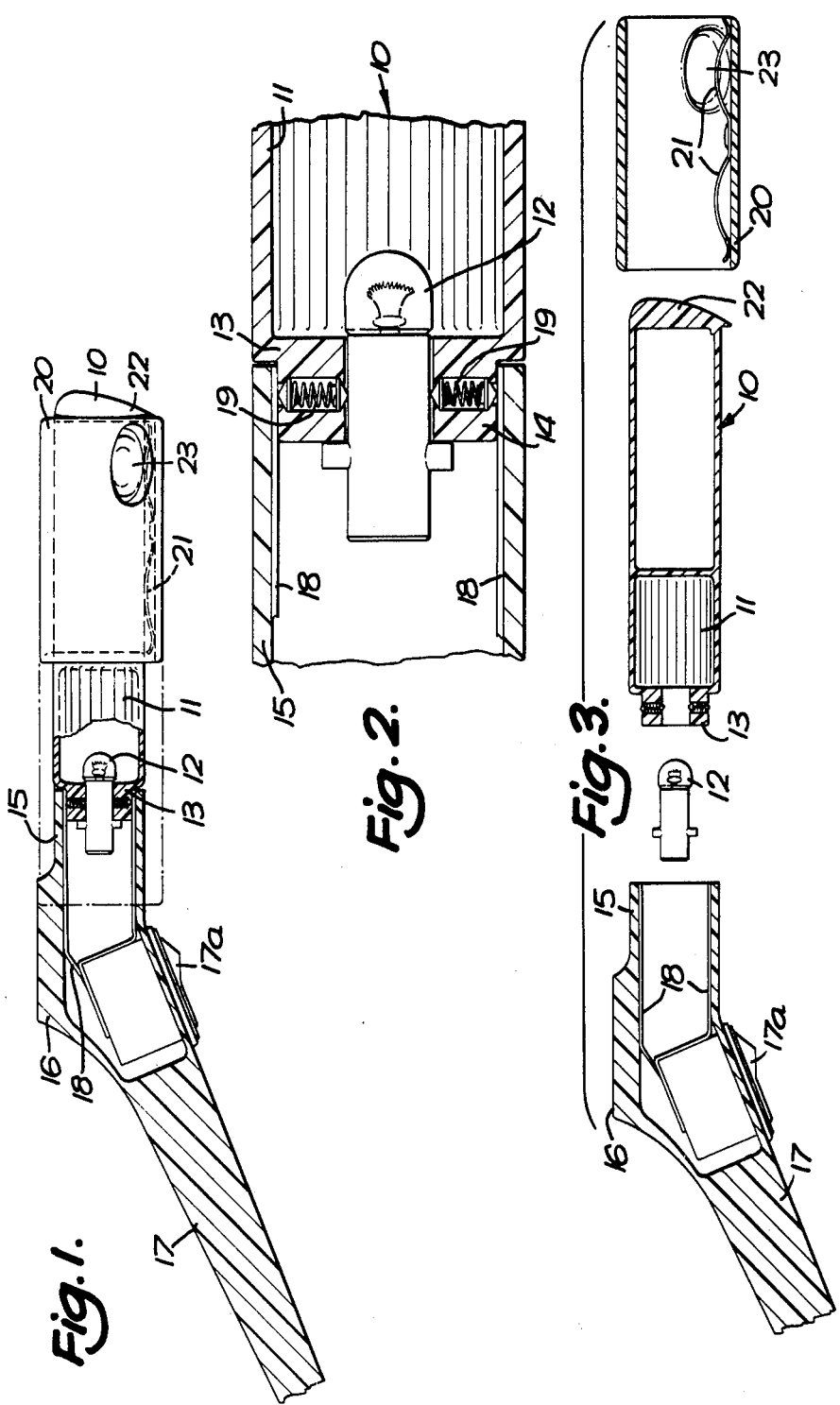

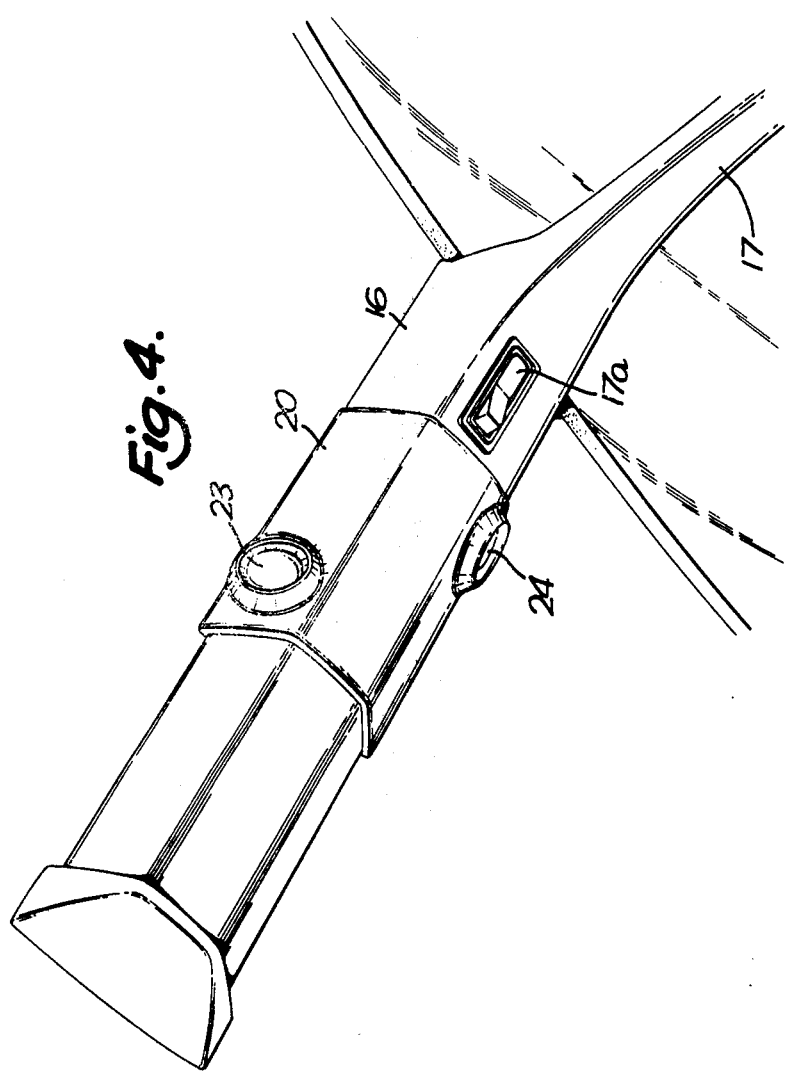

1

INTERIOR LIGHTS FOR MOTOR VEHICLES

BACKGROUND OF THE INVENTION

1. Field of the Invention

This invention relates to interior lights for motor vehicles.

2. Description of the Prior Art

Conventional interior lights for motor vehicles are either of the type comprising a lamp body mounted on the roof or a roof pillar and having a bulb enclosed by a diffuser to provide a general illumination or of the type usually mounted on a flexible stalk and providing a beam of light for detail work such as map reading. The latter form of light is usually only available as an extra at additional cost both for the light itself and the circuitry required for the light. The object of the present invention is to provide an interior light capable of giving both general and focussed beam illumination as required.

SUMMARY OF THE INVENTION

The invention provides an interior light for a motor vehicle comprising a lamp body including a light source, an opaque cover slidably mounted on the body to cover or expose the light source, said cover having at least one aperture therein to permit a beam of light to pass through the cover when the aperature is in register with the light source.

Preferably the cover has two spaced apertures therein facing in divergent directions to form beams of light extending in divergent directions.

Said apertures may be spaced apart along the cover in the direction of sliding movement thereof on the lamp body to register with the light source in different postions of the cover on the body.

In one position of the cover in which one of said apertures is in register with the light source, the light source may also be partly exposed by the cover to provide a general illumination in addition to the light beam provided by the aperture in register with the light source.

In any of the above arrangements, a lens may be provided in the or each aperture to focus the beam of light from the light source.

Again in any of the above arrangements the lamp body may be elongate having the light source at one end thereof, and the cover is mounted as in the lamp body to slide linearly along the body to cover or expose the light source.

In the latter case the cover may be of generally U-shaped cross-section having inturned flanges at the ends of the limbs thereof which engage the lamp body to retain the cover on the body and permit said sliding movement along the body.

In any of the above arrangements the light source may comprise at least one bulb and a light diffuser covering the bulb or bulbs.

The interior light of any of the above arrangements may be formed in combination with a vehicle interior mirror, the mirror having a supporting stem provided with a base for mounting on the vehicle and said lamp body forming a rearward extension of said base.

BRIEF DESCRIPTION OF THE DRAWINGS

FIG. 1 is a part section, part side elevation view of an interior light for a motor vehicle;

FIG. 2 is a more detailed view of part of the arrangement shown in FIG. 1;

FIG. 3 is an exploded view of the components of the light as shown in FIG. 1;

FIG. 4 is a perspective view from underneath of the light shown in FIG. 1.

DESCRIPTION OF THE PREFERRED EMBODIMENTS

Referring firstly to FIG. 1 of the drawings there is shown an interior light for a motor vehicle comprising an elongate lamp body 10 having, adjacent one end thereof, a diffuser 11 of "DIAKON" which encloses two "capless" bulbs 12 (only one of which can be seen) mounted side by side in the end wall 13 of the body. As shown in FIG. 2 the end wall of the body is formed with a projecting spigot 14 which engages in a socket 15 formed in the base 16 of the stem 17 of the vehicle interior mirror. The mirror is mounted, as can be seen in FIG. 4 at the centre of the underside of the vehicle roof adjacent the windscreen. The mirror base also carries an on/off switch 17a for the bulbs 12 which is connected by a printed circuit 18 and spring loaded terminals 19 to the bulbs.

An opaque cover 20 is slidable along the lamp body 10 to cover or expose the diffuser 11. The cover is of substantially open U-section having inturned flanges at the free ends of the limbs thereof which engage over the top of the lamp body so that the cover is a snap on fit on the lamp body. A wavy metal spring 21 is secured to the inside of the base of the cover and engages the underside of the lamp body to hold the flanges on the cover in engagement with the upper surfaces of the body. The cover 20 is slidable between a forward position shown in dotted outline in FIG. 1 in which the forward part of the cover extends over the socket 15 of the mirror base and the rearward part of the cover fully encloses the diffuser 11, and a rearward position shown in full line in FIG. 1 in which the cover engages the end stop 22 and the diffuser 11 is fully exposed.

Referring now to FIG. 4 of the drawings which shows an arrangement suitable for a left hand drive vehicle, the cover 20 is provided on either side thereof with two obliquely directed lenses 23, 24 which are spaced longitudinally of the cover. The lens 23 is set to provide a beam of light for use by a vehicle passenger, for example for map reading, and the lens 24 is set to provide a beam of light for use by the vehicle driver. In the case of the right hand vehicle driver the lenses 23 and 24 will be provided on the opposite sides of the cover 20.

When the cover is in its forward position as shown in FIG. 4 the lens 23 in the cover is in register with the diffuser 11 whereas the lens 24 is out of register with the diffuser 11. Thus when the light is switched on the lens 23 will direct a beam of light for use by the vehicle passenger. When the cover 20 is moved rearwardly the lens 23 moves out of register with the diffuser 11 and the lens 24 moves into register with the diffuser 11 so that the lens 24 will provide a beam of light for use by the driver and at the same time the cover may expose a part of the diffuser 11 to provide general illumination. When the cover 20 is fully retracted as shown in FIG. 1 the diffuser 11 is fully exposed to provide general illumination.

It will be appreciated that many modifications may be made to the above described embodiment without department from the scope of the invention. For example the lamp body could be made as a separate unit from the mirror base in which case the switch would be provided on the lamp body. In the latter case the light can be mounted at any convenient location in the vehicle interior and the lenses 23, 24 will then be located on the cover at appropriate positions to direct light in the required directions.

Also the cover and lamp body may be constructed so that when the drivers lens 24 is registered with the diffuser 11 the forward end of the cover 20 is at the forward end of the diffuser 11 so that the lens is fully covered by the cover and illumination is provided through lens 24 only. The diffuser 11 is then exposed by rearward movement of the cover 20.

We claim:

1. An interior light for a motor vehicle comprising an elongate lamp body having an end provided with a section having a ligh diffuser and a light source enclosed within the diffuser to provide diffused light, an opaque cover slidably mounted on the lamp body for linear movement along the length of the body to selectively cover and expose the light diffuser, the cover having two lens mounted therein and facing in divergent directions to provide focused beams of light directed in said divergent directions when the cover is covering the diffuser.

2. An interior light as claimed in claim 1 wherein said lenses are spaced apart.

3. An interior light as claimed in claim 2 wherein in one position of the cover in which one of said lenses is in register with the light source, the light source is also partly exposed by the cover to provide a general illumination in addition to the light beam provided by the lens in register with the light source.

4. An interior light as claimed in claim 1 wherein the cover is of generally U-shaped cross-section having inturned flanges at the ends of the limbs thereof which engage the lamp body to retain the cover on the body and permit said sliding movement along the body.

5. An interior light as claimed in claim 1 wherein the light source comprises at least one bulb and a light diffuser covering the bulb.

* * * * *